United States Patent [19]
Macaulay

[11] Patent Number: 5,913,636
[45] Date of Patent: Jun. 22, 1999

[54] OCEAN WAVES PRODUCING MEANS

[76] Inventor: Graham David Macaulay, 7 North Road, Leinster 6437, Western Australia, Australia

[21] Appl. No.: 08/605,437

[22] Filed: Feb. 22, 1996

[30] Foreign Application Priority Data

Feb. 22, 1995 [AU] Australia .................................. PN1343

[51] Int. Cl.⁶ ........................................................ E02B 3/00
[52] U.S. Cl. ................................................ 405/79; 472/13
[58] Field of Search ........................... 405/52, 79; 4/491; 472/13

[56] References Cited

U.S. PATENT DOCUMENTS

3,611,727  10/1971  Blandford ................................. 405/79

Primary Examiner—Tamara L. Graysay
Assistant Examiner—Tara L. Mayo
Attorney, Agent, or Firm—Larson & Taylor

[57] ABSTRACT

An ocean wave producing structure (10, 50, 60, 70, 80, 90, 100) having a support structure (14) and a web (12). The support structure (14) is fixed to the ocean floor (32) and the web (12) is arranged with its upswell end (12a) lower than its downswell end (12b) so that ocean swells (34a) travelling over the web (12) are forced upwardly to form into waves (34b). The shape and characteristics of the waves (34b) vary depending upon the gradients (24) of the sections (W1 to W8, 52 to 56) of the web (12). The support structure (14) allows ocean currents to flow through it and hence has a low impact upon the ocean environment.

7 Claims, 8 Drawing Sheets

Fig. 8.

OCEAN WAVES PRODUCING MEANS

FIELD OF THE INVENTION

The present invention relates to a ocean wave producing means particularly, although not exclusively, envisaged for use in producing ocean waves for riding by surf boards, boogie boards, body surfers and the like.

In the context of the present invention "tube" means the curved hollow formed on the underside of a cresting wave. The term derives from the general shape of that hollow once formed and that it collapses as the energy of the wave dissipates.

Also, in the context of the present invention the term "upswell end" refers to the end of the ocean wave producing means which is located closest to the approaching ocean swells, and the term "downswell end" refers to the end of the ocean wave producing means which is located farthest from the approaching ocean swells.

BACKGROUND OF THE INVENTION

In the sport of surfing there is a constant search for a good wave to surf. The formation of a good wave is the combination of the right wind conditions, the right ocean swells and the right ocean bed shape or reef shape to transform the swells into waves which have the best shape for riding.

Unfortunately, this combination tends to occur in only a few locations which usually require the rider to have to travel to get to them. This can be overcome in part by producing an artificial reef. However, conventional thinking in relation to artificial reefs involves the dumping of thousands of tonnes of rubble into the ocean to form a reef. This is time consuming, expensive and has a large impact on the ocean environment. In particular such artificial reefs alter ocean currents and can thus disrupt the entire ocean environment in the vicinity of the reef which is undesirable and generally unacceptable.

I have discovered a way to form an artificial reef with only a small impact on the ocean environment, and at relatively small cost.

SUMMARY OF THE INVENTION

Therefore, it is an object of the present invention to provide a ocean wave producing means for producing ocean waves whilst allowing ocean currents to flow through it.

In accordance with one aspect of the present invention there is provided an ocean wave producing means for transforming approaching ocean swells into waves, the ocean wave producing means comprising:

a support structure disposable upwardly from the ocean floor, the support structure being fastened to the ocean floor, the support structure being constructed to allow ocean currents to flow through it substantially undisturbed, and the support structure having its top located lower proximate its upswell end and highest proximate its downswell end; and, a web supported upon the top of the support structure, the web being disposed so that its upswell end is lower than its downswell end and the web also being disposed with a general upward gradient in a direction from the upswell end to the downswell end, the web serving to displace the ocean swells in a generally upwardly direction for transforming the ocean swells into waves.

Typically, the web is disposed at an angle to the direction of propagation of the ocean swells so that the transformation of the ocean swells into a wave occurs progressively along the length of the web for producing waves with longer ride times than would otherwise be the case. However, this is not essential to the formation of waves from ocean swells.

Typically, the shape of the web varies along its length so as to control the shape and the nature of the wave that it produces. For example, the shape of the web can be set to first cause the ocean swell to rise to start to form into a wave, then to commence to crest to form a wave, then to roll over to form a tube, followed by collapsing of the tube and rising of the wave to reform the tube. Such changes in the wave formation are achieved by changes in the gradient of the web along its length and across its width.

It is to be noted that it is not essential for the web to rise continually from its upswell end to its downswell. There can be sections of the web which fall in the direction of travel of the ocean swell. It is, however, essential for there to be a "general" overall increase in the height of the web from the upswell end to the downswell end so that the ocean swell is pushed upwardly. Since it is the upward movement of the swell which is responsible for the cresting of the swell to form a wave.

BRIEF DESCRIPTION OF THE DRAWINGS

An exemplary embodiment(s) of the present invention will now be described with reference to the accompanying drawings, in which.

DETAILED DESCRIPTION OF THE PREFERRED EMBODIMENT(S)

Figure 1:
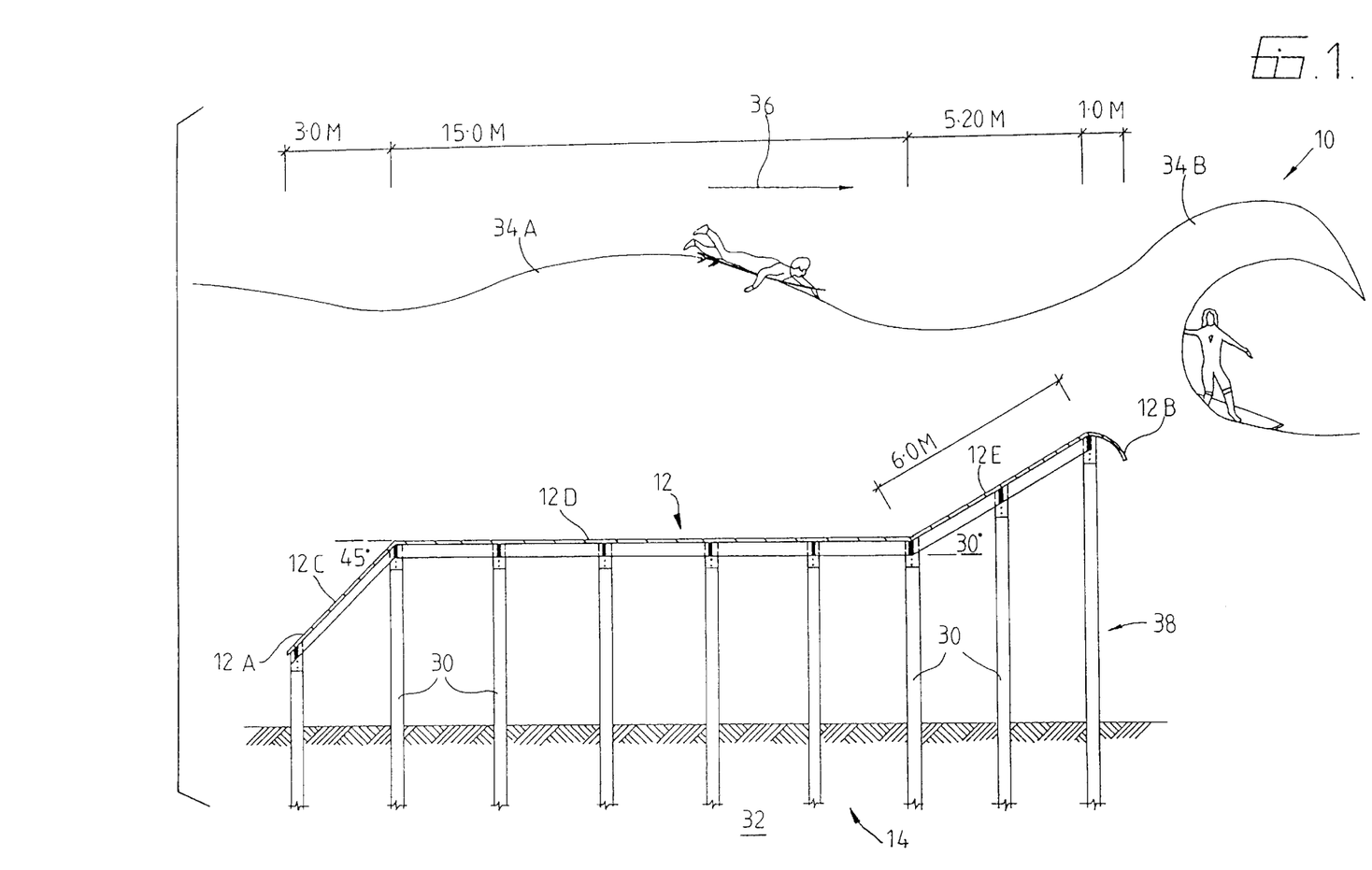
FIG. 1 is a cross-sectional side view of a ocean wave producing structure in accordance with the present invention, and shown transforming an ocean swell into a wave.

In FIG. 1 there is shown an ocean wave producing structure 10 comprising a web 12 and a support structure 14.

Figure 2:
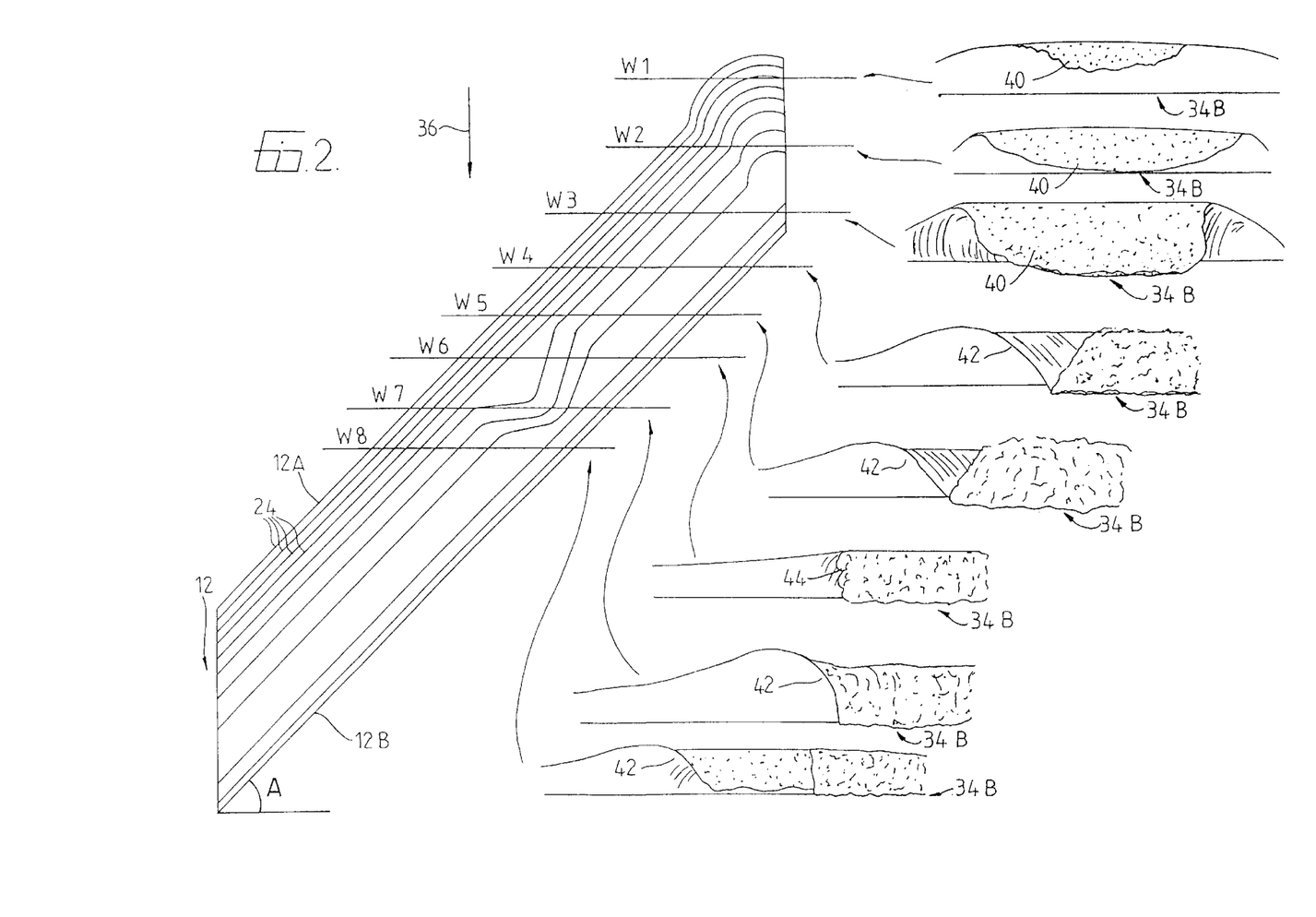
FIG. 2 is a plan view of the ocean wave producing structure of FIG. 1 shown in relation to approaching ocean swells and includes a series of front views of a wave showing the transformation of an ocean swell into the wave and the growth of that wave through stages of "tubing", collapsing and reforming the tube.

The web 12 is in the form of a plurality of sheets of material. The material may be fibreglass, polyurethane or the like. Each sheet typically has a plurality of fixings for joining adjacent sheets together to form the web 12. The sheets can be of differing shapes with differing gradients and contours so as to form a web 12 of the shape as shown in FIG. 2 in which gradient lines 24 show the contours of the web 12. Some of the differing shapes that can be used for sections of the web 12 are shown between lines W1 to W8. The differing shapes of the sections of the web 12 lead to the formation of waves of differing shapes and characteristics.

For example, the section of the web 12 between the lines W1 and W3 is designed to cause the ocean swell to be pushed upwardly to crest and to start to form a wave. The section of the web 12 between the lines W3 and W5 and between W8 and the far end of the web 12 are designed to allow the wave to form a tube as the wave travels from the web 12 at line W3 to line W5. The section of the web 12 between the Line W5 and W8 is designed to stop the travelling of the tube and to cause the tube to close off at the upswell end of the section at line W5 and causes the tube to reform at the downswell end of the section at line W8.

As shown in FIG. 1 the web 12 could have various gradients from its leading edge 12A (at the upswell end of the web 12) to its trailing edge 12B (at the downswell end of the web 12). This particular arrangement of the web 12 causes the wave to grow larger before its begins to crest. In particular the web 12 typically has a first portion 12C which has a relatively steep upward gradient for commencing to transform the ocean swells into waves. The web 12 has a second portion 12D which is substantially horizontal for causing the wave to grow in amplitude as the ocean swell continues to travel towards the shore. The web 12 also has a third portion 12E which has a relatively steep upward gradient for causing the wave to crest and break into the water between the structure 10 and the shore.

The support structure 14 is, in this embodiment, in the form of a plurality of piles 30 driven into the ocean bed 32. The height of the piles 30 determines the position at which the web 12 is supported and hence the location of the gradient lines 24 of the web 12. In FIG. 2 the gradient lines 24 are shown to rise in the direction of the approaching swells 34A shown by arrow 36. The piles 30 are typically arranged in a grid 38 of rows and columns. The rows are disposed along the length of the web 12 and the columns are disposed in the direction of the arrow 36 across the web 12. It is to be noted that the adjacent columns are skewed so that the grid 38 of piles 30 is disposed at an angle A (FIG. 2) to the approaching swells 34A. The web 12 is fixed atop the piles 30 by brackets or the like. The brackets could be in the form of sleeves which are formed into the web 12 and which fit over the piles 30 and are bolted thereto.

FIG. 2 shows the various wave shapes which are produced by the various gradients along the length and width of the web 12. Of course this is in fact only one wave 34B considered along its path of travel over the web 12 but that one wave has various different shapes considered at differing positions along the web 12.

At location W1—W1 the swell is pushed up to form the wave 34B and the wave 34B starts to form a crest 40. At location W2—W2 the crest 40 of the wave 34B starts to fall in front of the remainder of the wave 34B. At location W3—W3 the falling crest 40 crashes into the surface of the ocean in front of the wave. From location W3—W3 to location W5—W5 the wave 34B forms a tube 42. As the wave 34B travels from location W5—W5 to W7—W7 the tube ceases at 44 due to the shape of the gradient lines 24 of the web 12 easing to reduce the upward pressure on the ocean swell. From locations W7—W7 to W8—W8 pressure is put into the ocean swell again and the tube 42 reforms.

In use, the grid 38 of piles 30 is driven into the ocean bed 32 and arranged at an angle A (FIG. 2.1) to the predominant approaching ocean swells 34a. The web 12 is then attached to the top of the piles 30.

Ocean swells 34A approaching the web 12 are forced upwardly by the first portion 12C of the web 12. The swell 34A grows as it travels over the second portion 12D of the web 12. The swell 34A forms into a wave as it rises up the third portion 12E of the web 12 and transforms into the wave 34B when it leaves the trailing edge 12B of the web 12.

Alternative Embodiments

In the remaining Figures there are shown various ocean wave producing structures 50, 60, 70, 80, 90 and 100. Each structure 50, 60, 70, 80, 90 and 100 has a grid of piles or the like and a web for raising the ocean swells to form waves.

Figures 3A, 3B, 3C:
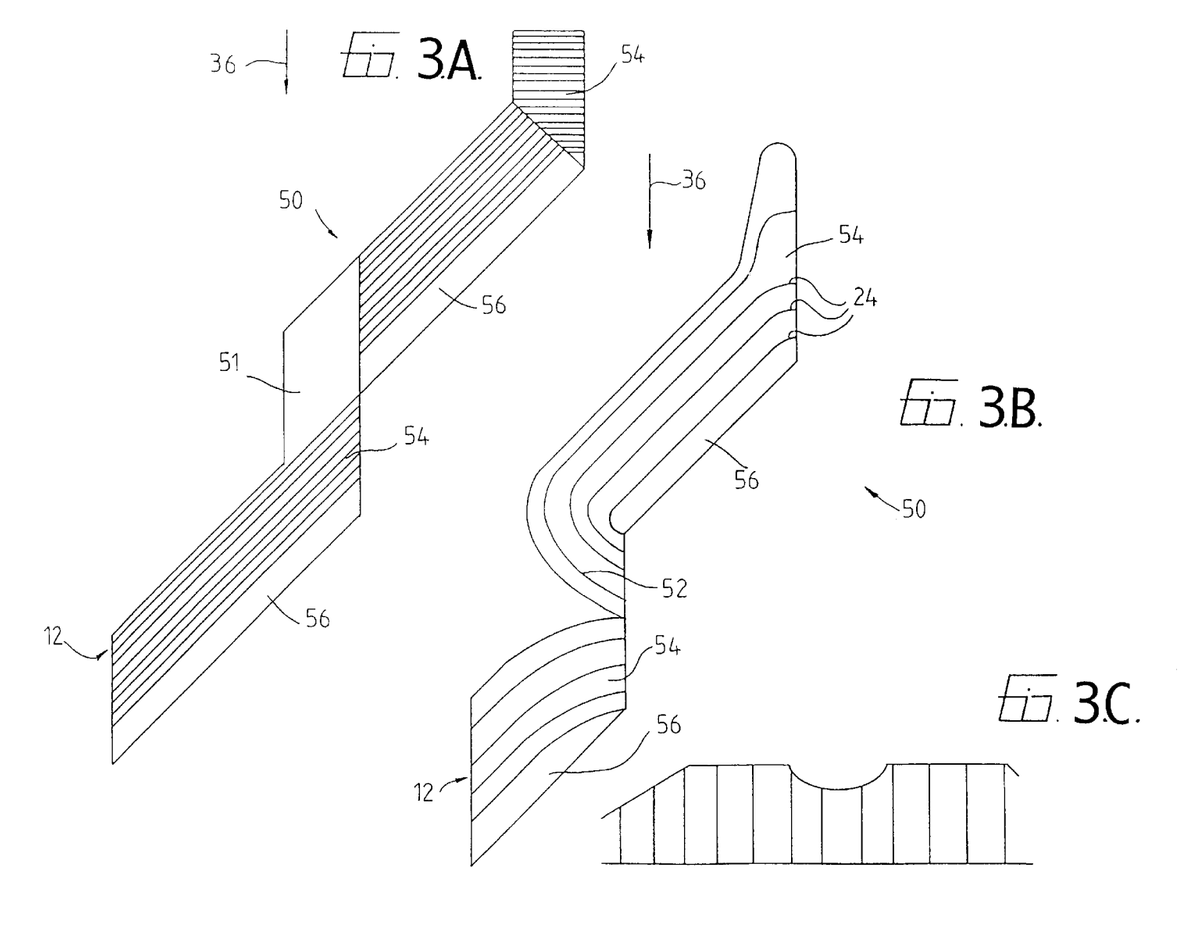
FIG. 3A is a plan view of an ocean wave producing structure in accordance with another embodiment of the present intention showing an abrupt drop intermediate its length to cause the tube to collapse.
FIG. 3B is a plan view of an ocean wave producing structure in accordance with yet another embodiment of the present invention showing a decline section intermediate its length to cause the tube to collapse and then reform.
FIG. 3C is a side view of the ocean wave producing structure of FIG. 3A with its upswell end at the left side of the Figure.

The ocean wave producing structure 50, shown in FIGS. 3A and 3B are very similar to that of FIG. 2, but differ in that they respectively have an abrupt drop section 51 and a decline section 52 to cause the tube produced in the wave to collapse to allow a rider of the wave to perform a manoeuvre referred to as a cut-back. The structure 50 is similar to that of FIG. 2 in that both have an incline section 54 at the upswell end of the web 12, a tube forming section 56 located between the incline section 54 drop section 51 or decline section 52, and a further tube forming section 56 located between the decline section 52 and a downswell end of the web 12.

Figure 4:
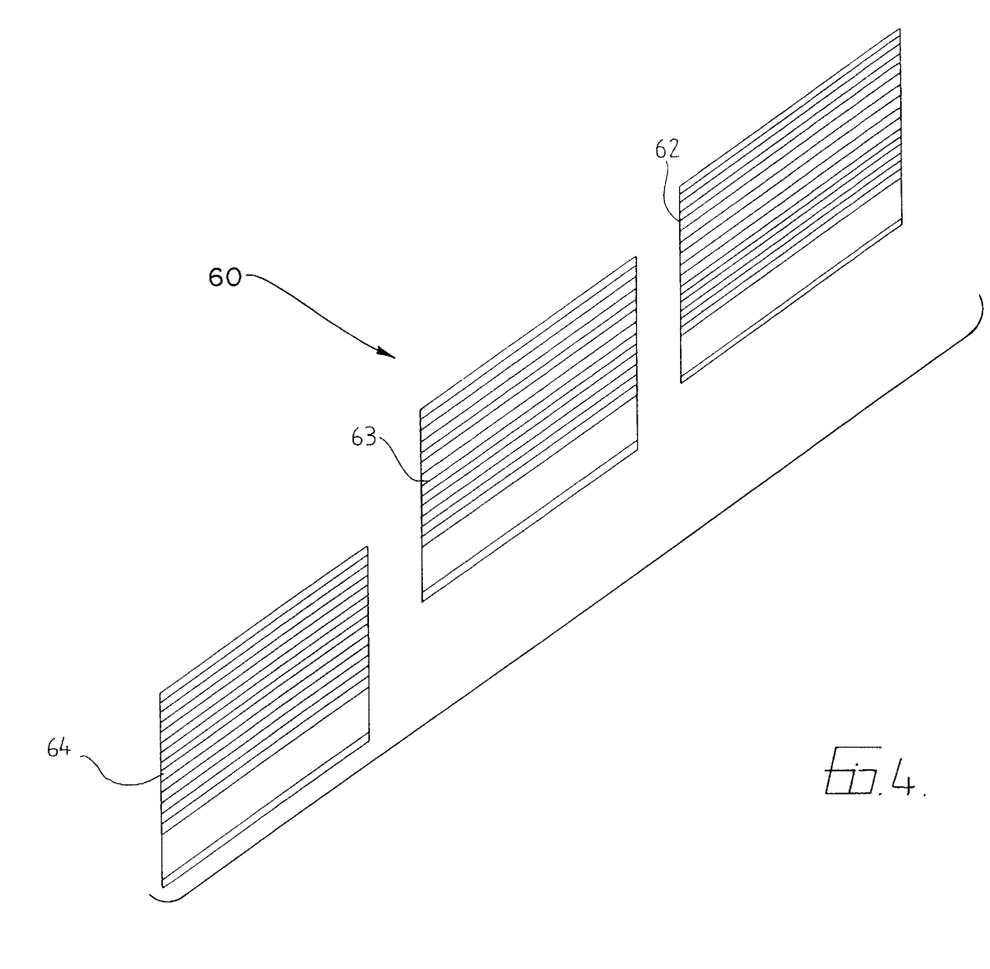
FIG. 4 is a plan view of three ocean wave producing structures set in a staggered series to cause the tube to collapse and then reform—twice.
Figure 5:
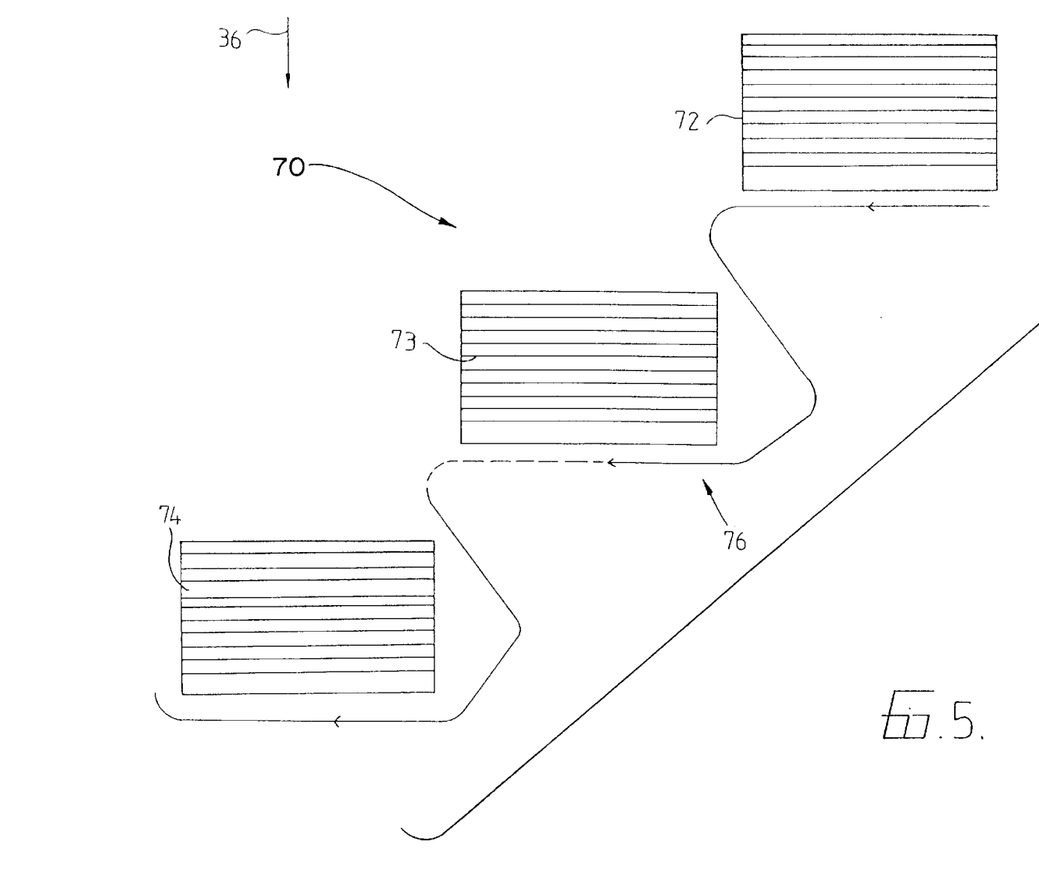
FIG. 5 is a plan view of three ocean wave producing structures in a staggered series, with each structure parallel to the approaching ocean swells.

The ocean wave producing structures 60 and 70 of FIGS. 4 and 5 differ from that of FIGS. 1 and 2 in that they are each split into 3 separate segments 62, 63 and 64, and 72, 73 and 74. Each segment 62, 63 and 64, and 72, 73 and 74 is staggered upswell of the previous segment. The result of this arrangement is that the 3 segments 62, 63 and 64, and 72, 73 and 74 cooperate in pushing the swell upward and increasing the size of the wave. Also, the gaps which exist between the segments 62, 63 and 64, and 72, 73 and 74 cause the tubes to collapse so that the rider can perform a cut-back manoeuvre or the like. The path that a surfer may traverse in riding waves formed by the three segments 72, 73 and 74 of the ocean wave producing structure 70 is shown by a line designated by numeral 76

Figures 6A, 6B:
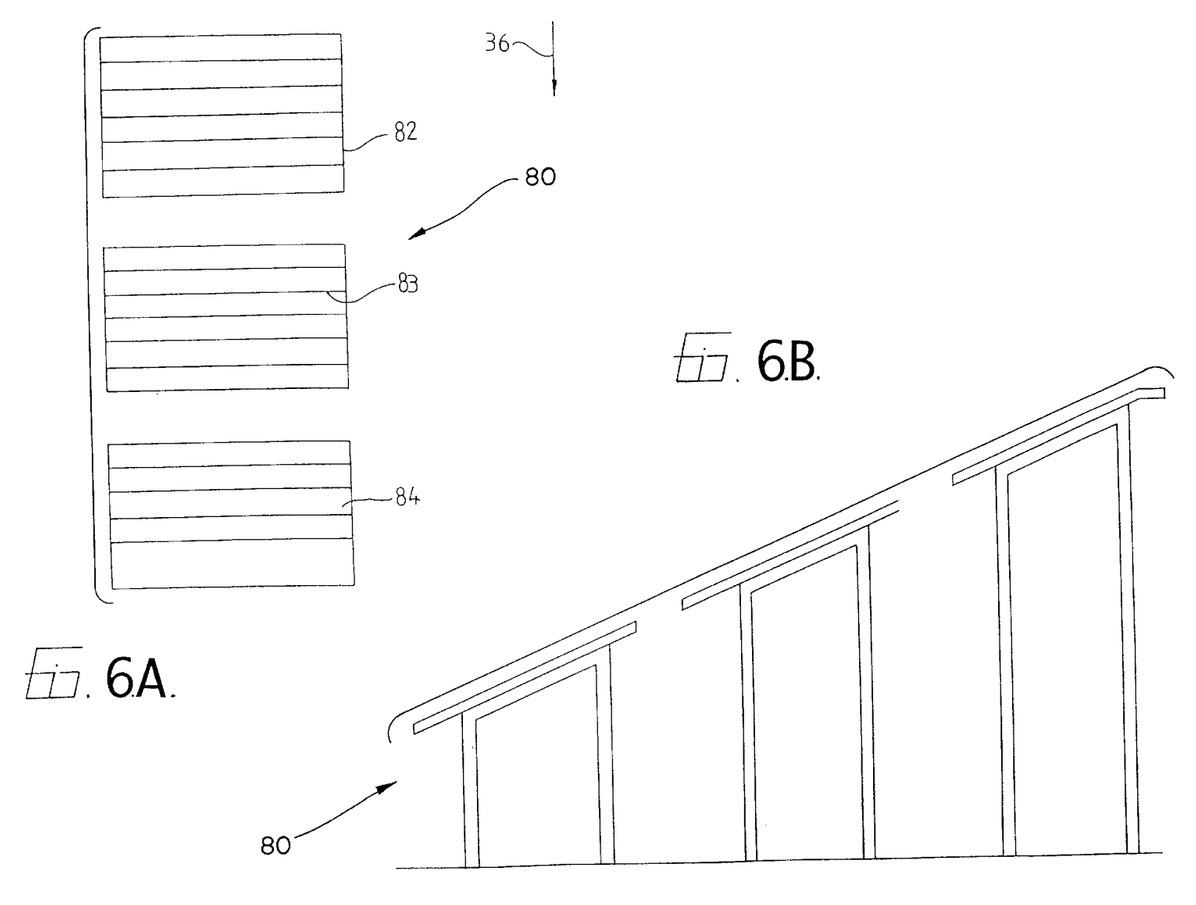
FIGS. 6A and 6B are a plan view and a side view respectively of three ocean wave producing structures arranged in series, the first two structures serving to pre-form the ocean swell to produce a large wave.

The ocean wave producing structure 80 of FIGS. 6A and 6B is also in the form of three separate segments 82, 83 and 84 arranged in series. Each consecutive segment 82, 83 and 84 in the downswell direction is higher than the previous segment 82, 83 and 84. The result of this arrangement is that each consecutive segment 82, 83 and 84 raises the swell higher to form the wave as the swell leaves the segment 84 which is farthest in the downswell direction. Typically, each segment 82, 83 and 84 is angled upwardly in the downswell direction as shown in FIG. 6B. However, each segment 82, 83 and 84 could be disposed substantially horizontally, with one of the segments 84 located farthest downswell having an upward slope in the downswell direction for transforming the building swell into a wave with tubing characteristics.

It is to be noted that the segments of the ocean wave producing structures in FIGS. 5 and 6A are disposed substantially parallel to the direction 36 of the swell 34A. The result of this orientation is that the wave produced has a much shorter ride time, however, increasing the number of the segments can have the effect of increasing the effective length of break of the wave 34b.

Figure 7:
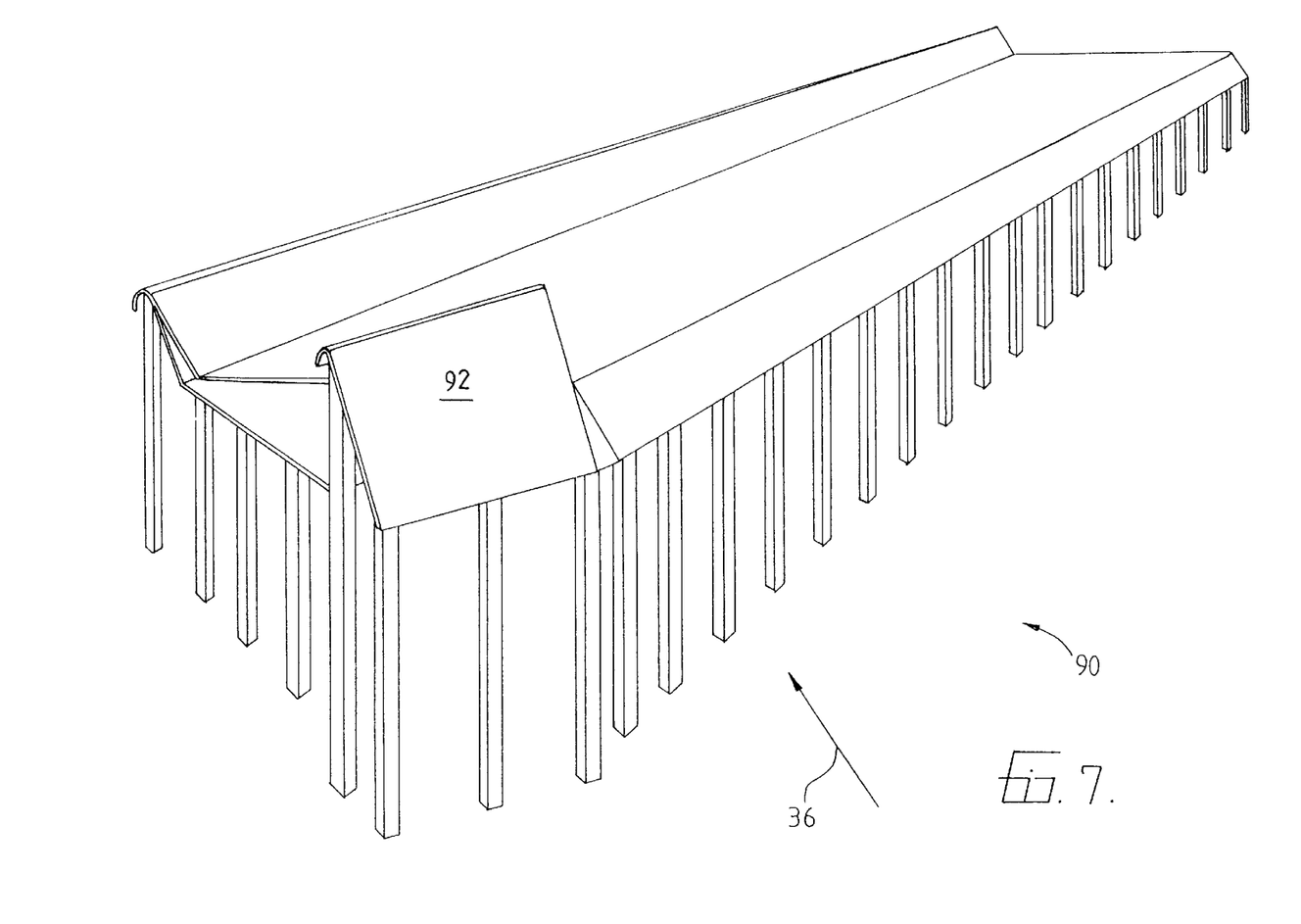
FIG. 7 is a perspective view, seen from the rear and above, of an ocean wave producing structure according to another embodiment of the present invention, having a pre-forming segment for assisting riders in being able to ride a wave produced by the remainder of the structure.

The ocean wave producing structure 90 of FIG. 7 differs from that of FIG. 1 in that a part of the second section 12D of the web 12 has a downward gradient in the direction of the ocean swell. Also, the web 12 has a pre-forming segment 92 to produce a small wave upswell of the main wave so as to help the rider to be able to surf a wave which otherwise would be too steep to be able to "get onto" (that is to say to be able to paddle fast enough to be able to propel his/her surf board onto the wave).

Figure 8:
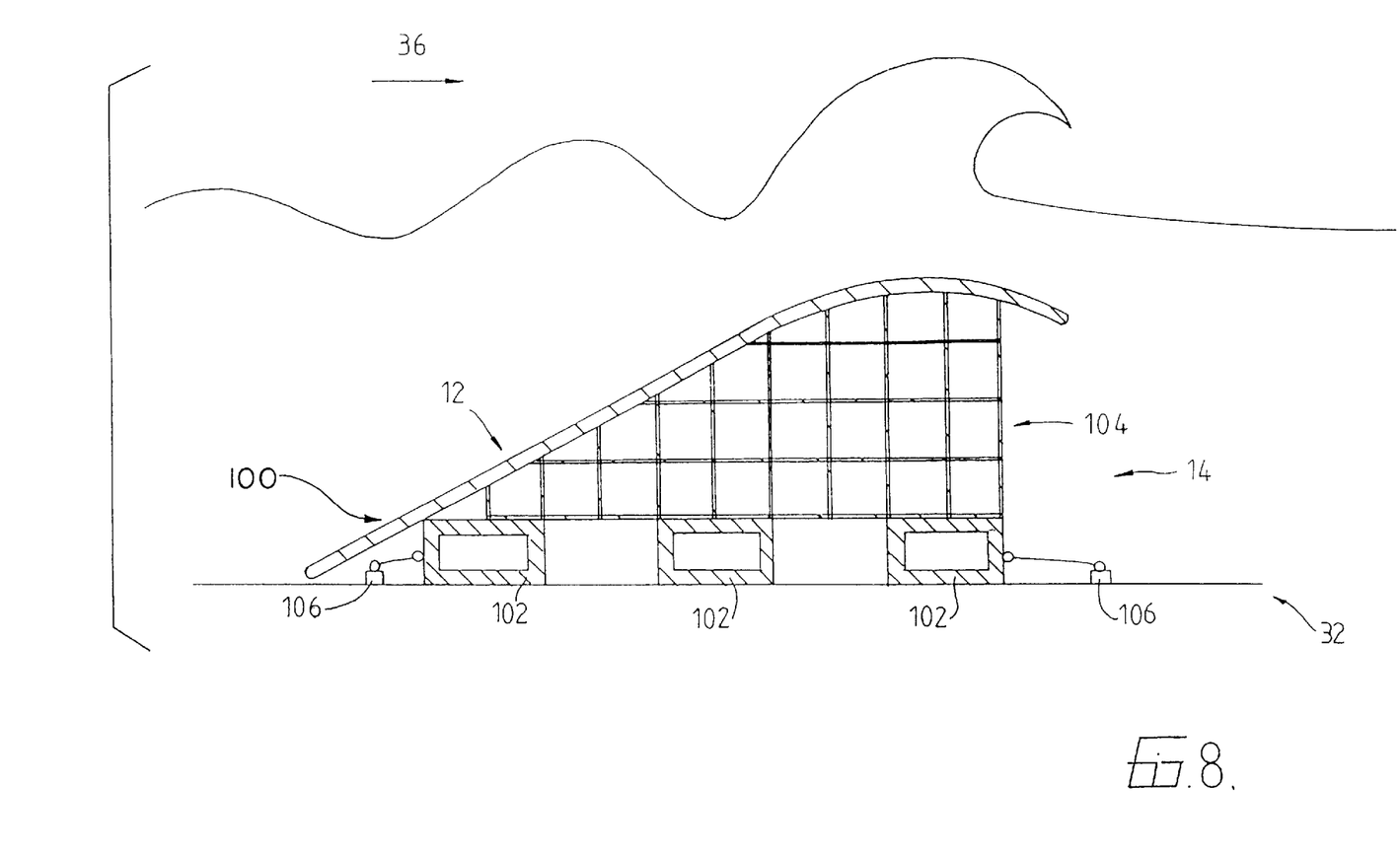
FIG. 8 is a cross-sectional side view of the ocean wave producing structure in accordance with another embodiment of the present invention in the form of a portable submersible reef.

The ocean wave producing structure 100 of FIG. 8 differs from that of FIG. 1 in that it is submersible and hence transportable. The ocean wave producing structure 100 has pontoons 102 which when filled will water sink to sink the web 12 below the water, but when filled with air float to raise the web 12 to the surface of the water for removal. The structure 100 has a support frame 104 for supporting the web 12 upon the pontoons 102. Typically, anchors 106 are used to fix the pontoons 102 to the ocean floor 32. The anchors 106 could be in the form of concrete blocks or the like.

It is preferred that the webs 12 of the structures 10, 50, 60, 70, 80, 90 and 100 be shaped so that the waves produced break into the water between the structure 10, 50, 60, 70, 80, 90 and 100 and the shore. That is it is preferred that the waves formed do not break into the webs 12 since the force of the waves breaking onto the web 12 could damage the web 12.

Further Variations

It is envisaged that a plurality of the ocean wave producing structures 10, 50, 60, 70, 80, 90 and 100 could be used together in combination to form waves. For example, sharp gradient preforming structures could be placed further out to sea from the main structure. The preforming structure then has the purpose of producing short sharp waves which induce greater momentum into the water and hence enhance the waves produced by the main structure. Also, re-forming structures could be placed closer into shore from the main structure. The re-forming structures have the purpose of reforming waves to produce smaller waves closer into shore once the initial waves from the main structure have substantially completed breaking.

It is also envisaged that combinations of left and right handed breaking waves could be formed by using differing orientations of the structures with respect to the swells. For example, the structure shown in FIG. 1 produces a right handed breaking wave, whereas if the structure was angled to the swells at an angle of (90-A) degrees then left handed breaking waves would be produced.

Advantages

The ocean wave producing structures 10, 50, 60, 70, 80, 90 and 100 of the present invention have the advantage that they can transform swells 34A into waves 34B with relatively little impact upon the ocean floor 32 and relatively little disruption to ocean currents when compared to the use of rubble to produce artificial reefs. Also, the ocean wave producing structures 10, 50, 60, 70, 80, 90 and 100 are relatively easy to install and removed as compared to artificial reefs formed of rubble. Further, the ocean wave producing structures 10, 50, 60, 70, 80, 90 and 100 can be erected at substantially any location at which good waves are desired for surfing. Hence, the ocean wave producing structures 10, 50, 60, 70, 80, 90 and 100 can be conveniently located so as to reduce the travelling usually required to reach a naturally good wave producing coastline, and hence reduces the pressure of people on such coastline and further increases the safety of surfers since there is less crowding because there is more surfable coastline. Still further with the ocean wave producing structures 10, 50, 60, 70, 80, 90 and 100 it is possible to specify the shape, characteristics and the length of the wave to be produced.

Modifications

Modifications and variations such as would be apparent to a skill addressee are considered within the scope of the present invention. For example, the web 12 could be made of materials other the fibreglass and/or polyurethane, such as, for example, a polyester web with metal rod reinforcement or the like. Also, the piles 30 could be made so that their heights could be adjusted so that the shape of the web 12 could be adjusted and hence the form of the waves 34B produced altered. Further, other forms of support for the web 12 in the ocean could be used provided they result in the ocean swells 34A being forced up to form waves 34B. Still further, the web 12 may have a negative gradient along part of its width from its leading edge 12A to its trailing edge 12B although there is an overall positive gradient from the leading edge 12A to the trailing edge 12B. Still further, the ocean wave supporting structure 14 could be fixed onto an existing reef to enhance its wave producing capabilities. Still further the ocean wave producing means 10 could be shaped semicircular when viewed in plan so as to accommodate the transformation of ocean swells 34A into waves 34B even when the ocean swells 34A approach from differing directions (the ocean wave producing means being disposed with its outer curved surface facing the approaching ocean swells 34A).

The Claims defining the invention are as follows:

1. Ocean wave producing apparatus for transforming approaching ocean swells into waves, the ocean wave producing means comprising:

a support structure disposable upwardly from the ocean floor, the support structure adapted to be fastened to the ocean floor, the support structure being constructed to allow ocean currents to flow through it substantially undisturbed, and the support structure having a top having an upswell end and a downswell end, said downswell end higher than said upswell end; and a web supported upon the top of the support structure, the web being disposed so that its upswell end is lower than its downswell end and the web also being disposed with a general upward gradient in a direction from the upswell end to the downswell end, the web serving to displace the ocean swells in a generally upwardly direction for transforming the ocean swells into waves;

said web including between said upswell end and said downswell end, a decline section having a decline sufficient to cause a formed wave to collapse.

2. Ocean wave producing apparatus according to claim 1, in which the web also includes a pre-forming segment located upswell of the remainder of the web for providing upward pressure to the approaching ocean swell to increase the momentum of the swell when it traverses the remainder of the web.

3. Ocean wave producing apparatus according to claim 2, in which the pre-forming segment is attached to the web at its upswell end.

4. Ocean wave producing apparatus according to claim 1, in which the web is formed in separate segments, each of the segments having its location chosen from one of a set including located staggered off axis to the direction of the swell for allowing a tube in the wave to collapse between the segments and located in series to increase the size of the swell, each successive segment in the downswell direction being higher than the previous segment so as to force the ocean swell upwardly for transforming it into the wave.

5. Ocean wave producing apparatus according to claim 1, in which the support structure has pontoon means which are submersible when filled with liquid and which float when filled with gas so that the ocean wave producing apparatus can be made portable.

6. Ocean wave producing means according to claim 1, wherein said decline section comprises an abrupt drop.

7. Ocean wave producing means according to claim 1, wherein the portion of said web between said upswell end and said decline section comprises a wave forming section, and the portion of said web between said decline section and said downswell end comprises a wave forming section.

\* \* \* \* \*